(12) United States Patent
Reiter

(10) Patent No.: US 6,581,578 B2
(45) Date of Patent: Jun. 24, 2003

(54) FUEL DELIVERY AND VENTILATION SYSTEM

(75) Inventor: Frank Reiter, Bad Soden (DE)

(73) Assignee: Mannesmann VDO AG, Frankfurt am Main (DE)

( * ) Notice: Subject to any disclaimer, the term of this patent is extended or adjusted under 35 U.S.C. 154(b) by 105 days.

(21) Appl. No.: 09/847,886

(22) Filed: May 2, 2001

(65) Prior Publication Data

US 2001/0054446 A1 Dec. 27, 2001

(30) Foreign Application Priority Data

Jun. 16, 2000 (DE) .......................... 100 28 985

(51) Int. Cl.[7] ............................................. F02M 37/04
(52) U.S. Cl. ................... 123/516; 123/518; 137/565.34
(58) Field of Search ................................. 123/516, 514, 123/509, 510, 519, 520, 521, 518; 137/571, 574, 576, 587, 565.34

(56) References Cited

U.S. PATENT DOCUMENTS

| | | | | | |
|---|---|---|---|---|---|
| 2,414,158 A | * | 1/1947 | Mock | .......................... | 123/516 |
| 5,139,000 A | * | 8/1992 | Sawert | ........................ | 123/514 |
| 5,389,245 A | * | 2/1995 | Jaeger et al. | ................ | 123/516 |
| 5,579,740 A | * | 12/1996 | Cotton et al. | ................ | 123/516 |
| 5,598,827 A | * | 2/1997 | Kato | ........................... | 123/518 |
| 5,647,331 A | | 7/1997 | Swanson | | |
| 5,718,208 A | | 2/1998 | Brautigan et al. | | |
| 5,865,160 A | * | 2/1999 | Kato | .......................... | 123/516 |
| 5,908,020 A | * | 6/1999 | Boutwell et al. | ........... | 123/541 |
| 6,123,511 A | * | 9/2000 | Sertier | ......................... | 417/87 |
| 6,216,672 B1 | * | 4/2001 | Mishima et al. | ............ | 123/516 |

FOREIGN PATENT DOCUMENTS

| | | | | |
|---|---|---|---|---|
| DE | 41 23 367 A1 | 7/1991 | .......... | F02M/37/10 |
| DE | 195 01 352 A1 | 7/1996 | .......... | F02M/37/18 |
| DE | 198 33 698 A1 | 7/1998 | .......... | B60K/15/03 |
| DE | 198 49 718 A1 | 4/2000 | .......... | F02M/37/00 |
| EP | 1 031 725 A2 | 2/2000 | .......... | F02M/37/10 |

OTHER PUBLICATIONS

Patent Abstracts of Japan 0222366 A of Feb. 23, 1989.
Patent Abstracts of Japan 022245463A of Mar. 17, 1989.

* cited by examiner

Primary Examiner—Carl S. Miller
(74) Attorney, Agent, or Firm—Richard A. Speer; Mayer, Brown, Rowe & Maw

(57) ABSTRACT

The fuel delivery and ventilation system according to the invention has a surge chamber in which the fuel pump is arranged, and a compensating container into which at least one ventilation line opens, the compensating container and the surge chamber being joined into a structural unit.

8 Claims, 2 Drawing Sheets

FUEL DELIVERY AND VENTILATION SYSTEM

BACKGROUND OF THE INVENTION

The subject matter of the invention is a fuel delivery and ventilation system for use in a fuel tank of a motor vehicle.

It is known to deliver fuel from a fuel tank to the internal combustion engine of a motor vehicle by means of a pump. In order, even when the filling level in the tank is low, to ensure reliable delivery in all situations where the fuel can move away from the pump, for example when cornering or when the motor vehicle is parked on a slope, the fuel pump is often arranged in a surge chamber. In this case, the fuel is delivered into the surge chamber and the fuel pump sucks up the fuel from the surge chamber.

Moreover, further units and subassemblies are arranged in today's fuel tanks and these likewise ensure reliable supplying of fuel under all operating conditions. These include, in particular, lines, valves, filters, pressure regulators and the ventilation system. The ventilation of a fuel tank has to be ensured both for the refueling procedure and during operation of the vehicle. For this, use is generally made of a ventilation system with which the ventilation during operation and refueling is ensured. Ventilation systems of this type often have a plurality of lines which lead from a plurality of locations in the tank to one or more compensating containers. These compensating containers are used as a liquid trap for the fuel and are arranged both within and outside the fuel tank.

A disadvantage of all these fuel delivery systems is the high outlay for the individual components with regard to their arrangement, fastening and installation. Since today's fuel tanks have a multiplicity of internal components, a large number of installation steps are required in order to fit all of these internal components in the tank. As a consequence, the manufacturing of the tank, or of the half shells from which the fuel tank is ultimately produced by joining them together, proves to be relatively complicated, since all of the internal components have to be fastened to the tank wall and connecting elements for the fastening of the internal components have therefore to be molded onto the tank wall. This requires complicated, and therefore expensive, tools for producing the individual half shells.

The invention is therefore based on the object of providing a fuel tank in which the production and the installation can be brought about more simply and with lower costs.

BRIEF DESCRIPTION OF THE INVENTION

The arrangement according to the invention comprises a delivery unit, which has a fuel pump arranged in a surge chamber, and a ventilation system for ventilation during operation and/or refueling with a compensating container which is arranged in the fuel tank and into which the ventilation lines open. The surge chamber and the compensating container are connected to each other and form a unit. As a result, the delivery unit and the compensating container and the ventilation system can be assembled and tested in advance and then arranged as a single unit in the fuel tank.

A wide variety of refinements are conceivable for the arrangement of the compensating container and surge chamber. In a first refinement, the compensating container can be arranged above the surge chamber. This refinement is particularly advantageous particularly in the case of tall tanks, since the compensating container can more usefully be arranged together with its ventilation lines in the upper region of the fuel tank, while the surge chamber can be fitted in the direct vicinity of the tank floor. In the case of flatter fuel tanks the surge chamber can be arranged next to the compensating container. In this case, the surge chamber and compensating container are separated from each other by a common wall.

In one advantageous refinement, the compensating container and the surge chamber are separate components which are connected to each other. The two components can subsequently be joined in a positive-locking manner as a latching, plug-in or screw connection, in a materially connected manner by bonding or welding, or with a frictional connection by means of clamping elements. In this connection, there is the option of first of all fitting all of the components, for example the fuel pump, filter, pressure regulator, suction jet pumps, filling-level sensor, in the surge chamber and then of connecting the surge chamber to the compensating container. The ventilation system can also be fitted to the compensating container in advance. The device according to the invention can be used both in injection-molded tanks and in blow-molded tanks. To this end, in an injection-molded tank the device is fitted in one of the half shells before the tank half shells are joined together. When used in a blow-molded tank, the finished device is placed in the shaped part directly prior to the blow molding.

It is also conceivable to produce the compensating container and the surge chamber integrally. The advantage here is that the two components then no longer have to be connected to each other. The component forming the compensating container and the surge chamber can be produced by means of injection molding, for example. In one refinement of this component, in which the compensating container is arranged above the surge chamber, it is advantageous to design at least the region of the surge chamber to be open, in order to make possible subsequent installation of the fuel pump and the associated components. The surge chamber can be designed to be closeable by a lid, which is designed as the base, once installation has taken place. In a similar manner to this, the compensating container can also be designed to be closeable by a lid.

A refinement has proven advantageous in which the side walls of the surge chamber are flexible in such a manner that the surge chamber is variable in its height. This ensures that the fuel delivery and ventilation system according to the invention can be adapted to the height of the fuel tank, since the height thereof varies as a consequence of the filling level. It is thereby ensured that the surge chamber is in contact with the floor of the fuel tank and the fuel is therefore sucked up at all times from the deepest point in the fuel tank. At the same time, the ventilation lines are always located in the upper region of the fuel tank, thereby ensuring reliable ventilation. The fuel delivery and ventilation system can be fixed to the upper or lower boundary wall of the fuel tank.

It further has to be ensured that the liquid fuel collecting in the compensating container is removed so as to avoid flooding of the compensating container. For this purpose, the compensating container can be equipped with a valve, in particular with a nonreturn valve. This solution is advantageous when the fuel to be removed is conducted into the surge chamber and the latter is of closed design. The nonreturn valve only opens if the hydrostatic pressure in the surge chamber is lower than the pressure in the compensating container. Flooding of the compensating container is therefore prevented at the same time. The arrangement of an active suction means using a pump has proven favorable. This may be a suction pump operated by the flow or by the cutoff quantity of a pressure regulator, or an auxiliary pump or else the fuel pump or a further stage in the fuel pump. The fuel which is removed is conducted into the fuel tank. In this connection, long lines can be dispensed with.

BRIEF DESCRIPTION OF THE DRAWINGS

The invention is explained in greater detail using a number of exemplary embodiments. In the drawings.

DETAILED DESCRIPTION OF THE INVENTION

Figure 1:
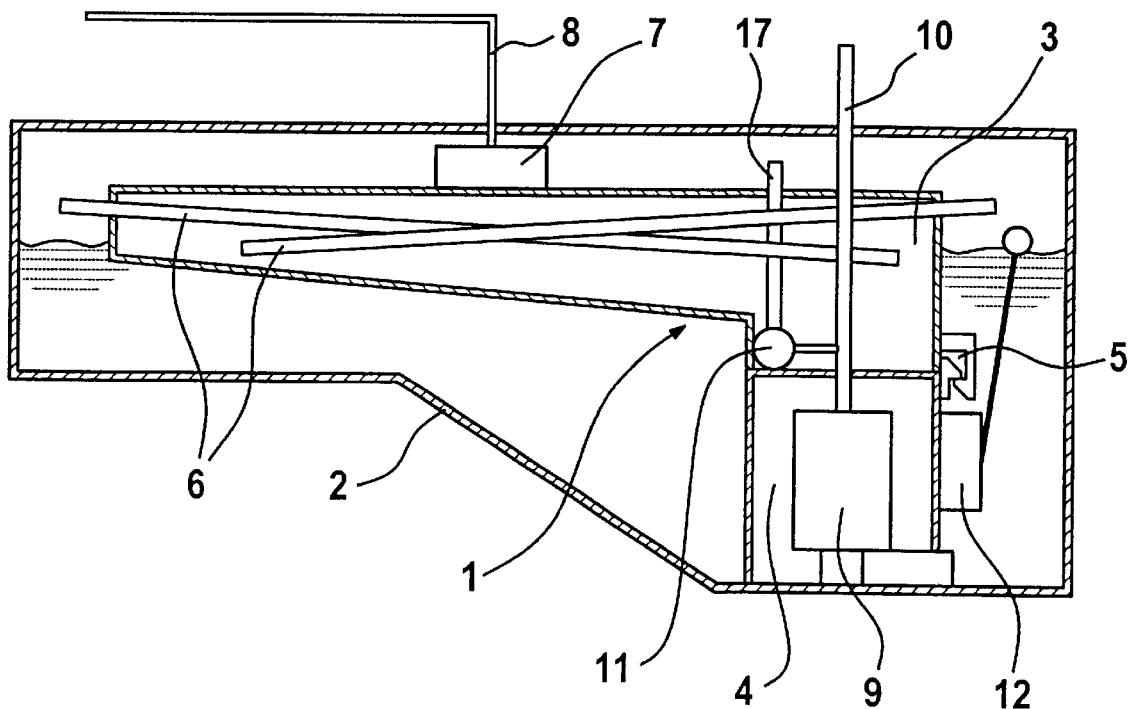
FIG. 1 shows a schematic illustration of the fuel delivery and ventilation system according to the invention in a fuel tank.

The fuel delivery and ventilation system 1 which is illustrated in FIG. 1 is arranged in a fuel tank 2. The fuel delivery and ventilation system 1 comprises a compensating container 3 and a surge chamber 4 which are joined as a structural unit by means of latching elements 5. Lines 6 for ventilation during operation and refueling are arranged in the compensating container 3. Furthermore, the compensating container 3 has a valve 7 from which a line 8 leads to a filter (not illustrated). Arranged in the surge chamber 4 is a fuel pump 9 which sucks up fuel from the fuel tank 2 and delivers it via a flow line 10, pressure regulator and filter to the internal combustion engine of the motor vehicle. A sensor 12 is fastened to the surge chamber 4 and is used for determining the filling level in the fuel tank. A suction jet pump 11 operated by the flow line 10 sucks up the liquid fuel accumulating in the compensating container and conducts it into the fuel tank 2 by means of a line 17.

Figure 2:
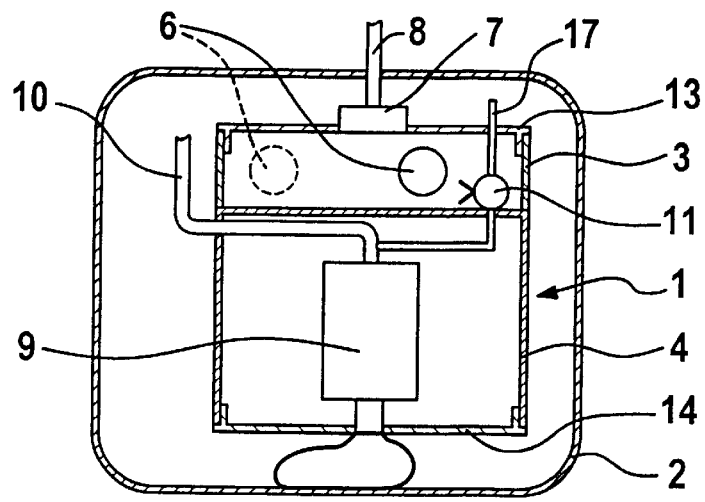
FIGS. 2–4 show further refinements of the fuel delivery and ventilation systems.

The fuel delivery and ventilation system 2 which is illustrated in FIG. 2 shows a compensating container 3 which is arranged above the surge chamber 4. Both the compensating container 3 and the surge chamber 4 are an integral unit closed by lids 13 and 14. The flow line 10 is led laterally out of the surge chamber 4.

Figure 3:
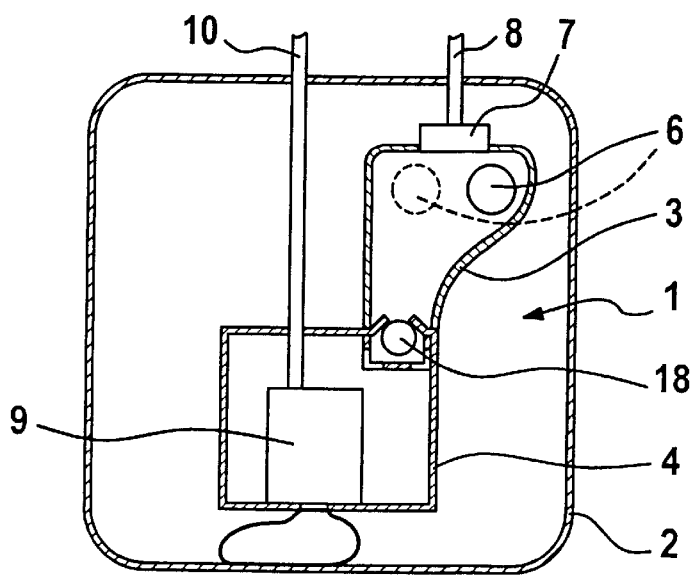

In FIG. 3, the compensating container 3 is arranged laterally above the surge chamber 4. The two containers are physically joined to each other and connected fluidically via a nonreturn valve 18. This ensures that first the liquid fuel collecting in the compensating container 3 passes into the surge chamber 4 and that secondly penetration of fuel into the compensating container 3 via the surge chamber 4 is avoided.

Figure 4:
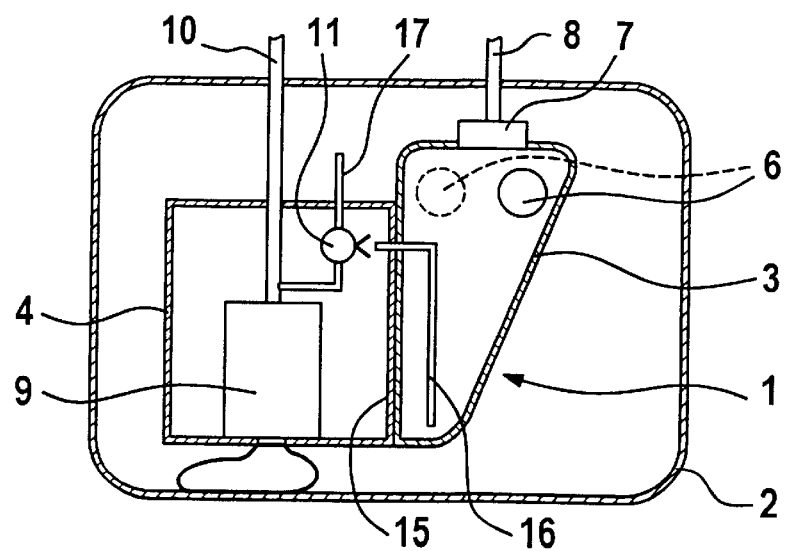

FIG. 4 finally shows the arrangement of the compensating container 3 next to the surge chamber 4. The two containers 3, 4 are joined to each other at the common wall 15. A suction jet pump 11 which is fed by the flow line 10 is arranged in the surge chamber 4. A suction line 16 which is connected to the suction jet pump 11 connects the compensating container 3 to the section jet pump 11 via which the fuel is conducted out of the compensating container 3 into the fuel tank by means of the line 17.

What is claimed is:

1. A fuel delivery system for a motor vehicle engine comprising:
    (a) a fuel tank for holding a pre-selected quantity of fuel for operation of the motor vehicle;
    (b) a fuel delivery unit mounted within the fuel tank for pumping fuel from the fuel tank to the vehicle engine and for venting the interior of the fuel tank, in which the delivery unit includes;
        (i) structure defining a surge tank which holds a fuel pump;
        (ii) compensating chamber joined to the surge tank as a structural unit thereof and
        (iii) at least one ventilation line connecting the compensatory chamber to the interior of the fuel tank, whereby fuel vapor can be vented from the fuel tank into the compensating chamber.

2. The fuel delivery system as claimed in claim 1, wherein the surge chamber and the compensating container are separate components which are joined to each other.

3. The fuel delivery system as claimed in claim 2, wherein the surge chamber and the compensating container are joined by a frictional latch.

4. The fuel delivery system as claimed in claim 2, wherein the surge chamber and the compensating container are joined by a bonding material.

5. The fuel delivery system as claimed in claim 1, wherein the surge chamber and the compensating container are formed integrally as a single constructional unit.

6. The fuel delivery system as defined in claim 1 or 2, wherein the surge chamber and the compensating container can each be closed with a lid.

7. The fuel delivery system as claimed in claim 1 or 2, wherein the surge chamber and the compensating container are connected via a non-return valve.

8. The fuel delivery system as claimed in claim 1 or 2, wherein the surge chamber and the compensating container are connected via a jet pump.

* * * * *